Oct. 14, 1958     F. W. BOYCE ET AL     2,856,233
FLUID MOTOR DEVICE FOR OPERATING TAIL GATE LATCHES
Filed April 22, 1954                   2 Sheets-Sheet 2
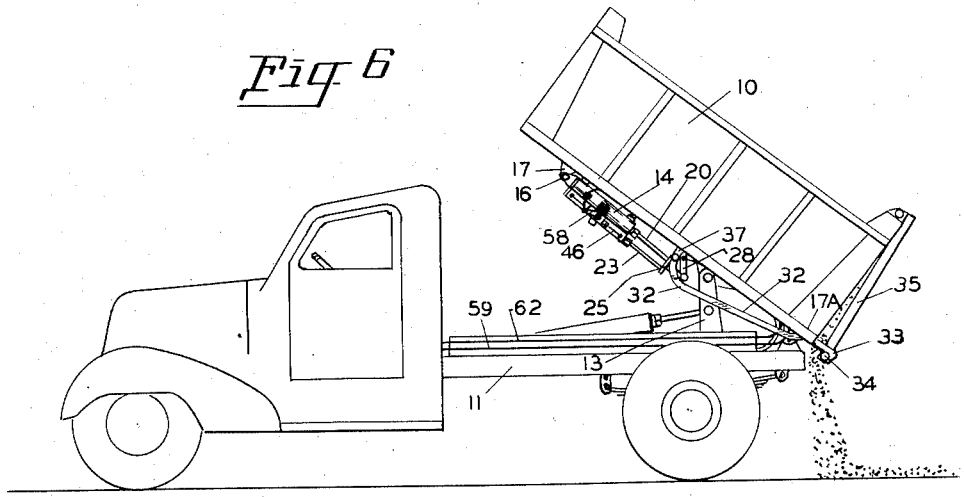
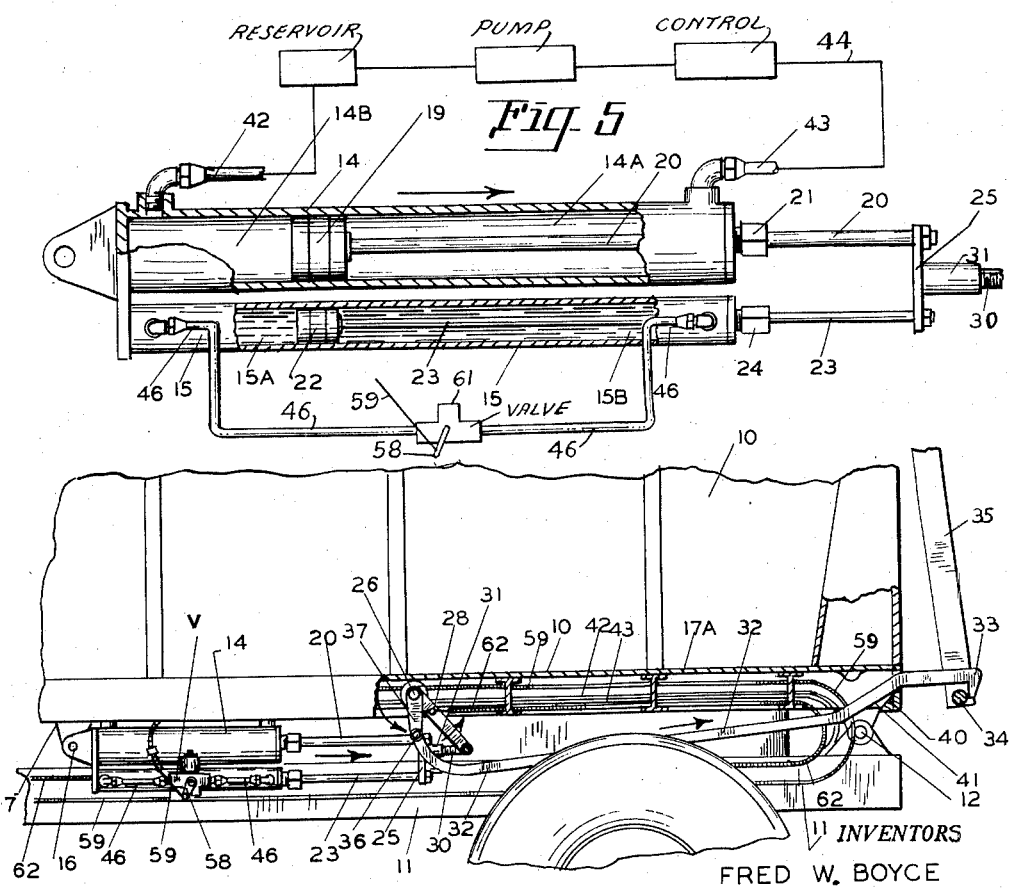
INVENTORS
FRED W. BOYCE
LAWRENCE D. MOELLER
By Kimmel + Crowell
Attys

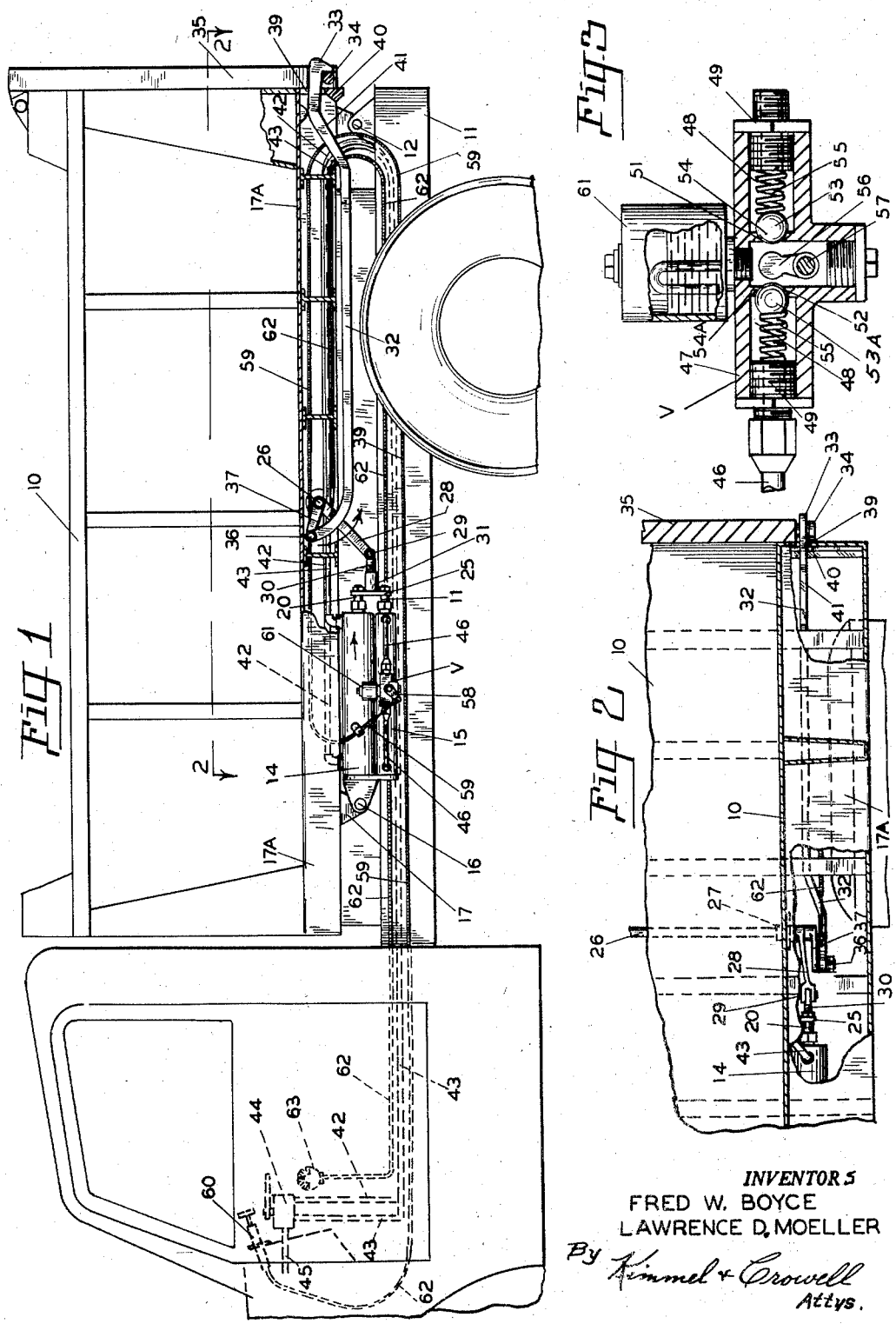

United States Patent Office 2,856,233
Patented Oct. 14, 1958

2,856,233

FLUID MOTOR DEVICE FOR OPERATING TAIL GATE LATCHES

Fred W. Boyce and Lawrence D. Moeller, Portland, Oreg.

Application April 22, 1954, Serial No. 424,896

4 Claims. (Cl. 298—23)

This invention relates to devices for operating tail gate latches, and is particularly adapted for operating latches on tail gates on dump trucks and the like.

The primary object of the invention is to unlatch the gate and permit it to open to a predetermined opening for spreading of materials.

This new device can operate many other types of apparatus or machines wherein it is desired to move an object by an air or vacuum cylinder, then lock the position of the object by fluid in an auxiliary cylinder.

These and other incidental objects will be apparent in the drawings, specification and claims.

Referring to the drawings:

Figure 1 illustrates our new and improved tail gate latch operating device mounted to a dump truck, the same being shown in a position to hold the gate closed.

Figure 2 is a fragmentary plan view, taken on lone 2—2 of Figure 1, illustrating the position of the latch and operating levers, parts broken away for convenience of illustration.

Figure 3 is a sectional detail view of the valve mechanism for controlling the flow of the holding or locking fluid.

Figure 4 is a fragmentary view of the side of the truck, illustrating the latch and operating device in position with the gate partially open.

Figure 5 is a sectional view of the operating cylinder and the holding or locking cylinder, parts broken away for convenience of illustration.

Figure 6 illustrates how the mechanism operates while the truck is in dumping position.

Referring more specifically to the drawings:

The body of a dump truck is indicated by numeral 10, mounted to the truck frame 11 in the usual way, as for instance the hinged connection 12. We illustrate in Figure 6 the usual hydraulic lifting gear 13. We do not wish to be limited to the mounting of our device on dump trucks, as it could be mounted to any type of truck or for many other uses too numerous to mention.

Our invention consists of mounting a pair of cylinders 14 and 15 to either the frame 11 or the body 10 of the truck. In the drawings we illustrate the same being pivotally connected at 16 to the bracket 17. The said bracket is connected to any suitable structure relative to the body 10 of the truck, as the fender 17A of the body 10.

Referring to Figure 5, the cylinder 14 has a piston 19 operating therein, the piston 19 being connected to the piston rod 20 extending through the stuffing box 21. The cylinder 15 has a piston 22 operating therein and connected to the piston rod 23 operating through a stuffing box 24. The outer ends of the piston rods 20 and 23 are connected together by the cross head 25 so that they will operate in unison.

A shaft 26 is journalled within bearings 27 associated with the body 10 of the truck. This shaft extends completely across the width of the body 10 of the truck. A link or crank 28 is keyed at one end of the shaft 26 and having its opposite end pivotally connected at 29 to the threaded rod 30. The rod 30 is threaded within the socket 31 forming part of the cross head 25. The object of threading this rod 30 is to provide for fine adjustments.

The latches consist of a pair of bars 32, one on either side of the body 10 of the truck. A hook 33 is formed on one end of the bars 32 and is adapted to latch over the usual tail gate pins 34 forming part of the tail gate 35. The opposite end of the locking bars 32 is adapted to be pivotally connected at 36 to the links or cranks 37, the cranks 37 are keyed to both ends of the shaft 26. The locking bars 32 operate through openings 39 located at the rear end of the body 10. The bars 32 rest on cross supports 40.

Offset cams 41 are formed on the latch end 33 of the locking bars 32. These cams 41 are adapted to operate on the transverse support bar 40 and disengage the hook 33 from the pin 34, as best illustrated in Figure 4. The bars 32 are forced rearwardly by the air or vacuum cylinder 14. Air or vacuum can be applied to either end of the cylinder 14 by way of the hose lines 42 and 43, which terminate in a valve 44, indicated by dotted lines in Figure 1. This valve 44 receives its air or vacuum supply through the piping 45 from any suitable source. By operating the valve 44 the piston 19 can be moved in either direction. The movement of the piston 19 can be arrested at any time by the piston 22 within the locking or holding cylinder 15.

Referring to Figures 1, 3 and 4, a valve V is connected between each end of the cylinder 15 by way of the piping 46. This valve V consists of a body 47, having openings 48 leading to the pipe fittings 49. Located within the valve V are partitions 51 and 52. Check balls 53 and 53A are seated within openings 54 and 54A located within these partitions 51 and 52. Springs 55 seat the balls 53 and 53a against their seats or openings 54 and 54A. When these balls 53 and 53a are seated they shut off the flow of fluid through the valve V from both ends of the cylinder 15 through the piping 46. This will stop the movement of the piston 19, which will hold the latches 32 in a predetermined position, holding the gate 35 of the truck at a desired opening.

A ball point lever 56 is keyed to the shaft 57, which is rotated by the lever 58 by way of the flexible operating cable 59 from the operating plunger 60 located within the cab of the truck. A fluid supply container 61 is mounted on the valve V for maintaining the fluid complete in the cylinder 15 at all times.

We have provided a means of determining the amount that the tail gate 35 is open by the control wire 62 which is connected to the levers 28 at its one end and to the indicating gauge 63 at its opposite end.

We will now describe the operation of our new and improved device for operating tail gate latches. In our drawings we will assume that vacuum is to be used to operate the cylinder 14. In the event it is desired to unlatch the hooks 33 from the pins 34 of the gate 35 permitting the gate 35 to open, the valve 44 is operated so as to apply a vacuum into the end 14A of the cylinder 14 by way of the hose line 43 from the valve 44. The plunger 60 will also be operated so as to move the lever 58 in the direction of the arrow, Figure 1. This will rotate the lever 56, unseating the ball 53 from its seat, allowing the fluid contained within the end 15B of the cylinder 15 to pass through the opening 54, forcing the ball 53A off its seat and permitting the fluid to enter the opposite end 15A of the cylinder 15 when the vacuum within the end 14A of the cylinder 14 moves the piston 19 in the direction of the arrow so as to move the crank 28 in the direction of the arrow, rotating the crank 37 on each side of the truck past their center line and moving the latching bars 32 rearwardly of the truck towards the position shown in Figure 4. This movement can be arrested at any time by centering the lever 58 and the ball point lever 56, allowing the balls 53 and 53A to seat.

In the event it is desired to completely open the gate 35 or unlatch the hooks 33, the lever 58 is held in the position shown in Figure 4 until the cam surfaces 41 of the latching bars 32 rides up on the cross supports 40 and the hooks 33 are raised above the pins 34, releasing the gate 35 completely. The latch bars 32 would remain in this position until the gate 35 was again closed, at which time the valve 44 in the cab would be operated so as to cause a vacuum to exist in the end 14B of the cylinder 14 through the pipe line 42.

In order to allow the pistons 19 and 22 to move in the opposite direction of the arrow, Figure 5, the control valve 60 would operate the lever 58 in the opposite direction from that shown in Figure 1. This would unseat the ball 53A in the valve V, which would permit the liquid within the end 15A of the holding cylinder 15 to flow through the opening 52 into the valve V, unseating the ball 53, allowing the liquid to pass through into the end 15B of the cylinder 15 permitting free movement of the piston 22 until the lever 58 would be centered, which would stop the flow of the liquid and would stop the movement of the piston 19.

When the piston 19 reaches its full travel in the opposite direction of the arrow, and pulls the crank 28 to the position in Figure 1, the crank 37 will pass the center line between the keeper pin 34 and the shaft 26 which locks the locking bars 32 by an over center toggle locking action in a fixed or holding position with a slight tension within the bar against the hook 33 and the pin 34. The supply liquid reservoir 61 maintains a full supply of fluid within the cylinder 15 and the valve V at all times.

What is claimed is:

1. In combination, a dump truck having a chassis, a dump body pivotally mounted on said chassis, means for elevating said pump body, a tail gate pivotally mounted on said dump body, said tail gate having a pair of keeper pins spaced on and from the pivotal mounting of the tail gate, a pair of locking bars mounted on opposite sides of said body for reciprocal movement thereon, each of said bars having a hook integrally formed on one end thereof for engagement with a respective one of said keeper pins, a pneumatic cylinder secured to said dump body, a piston having a piston rod secured thereto and mounted for reciprocation in said pneumatic cylinder, a hydraulic cylinder secured to said pneumatic cylinder in parallel relationship therewith, a piston having a piston rod secured thereto and mounted for reciprocation in said hydraulic cylinder, a crosshead connecting said first named piston rod and said second named piston rod, means connecting said locking bars to said crosshead, means connecting each end of said pneumatic cylinder to a source of fluid pressure supply, a valve means in said means connecting the ends of the pneumatic cylinder regulating the movement of said first named piston, means connecting each end of said hydraulic cylinder to a source of liquid supply, and valve means in said means connecting the ends of the hydraulic cylinder regulating the movement of said second named piston.

2. A device as set forth in claim 1 having gauge means and means connecting said gauge means to said means connecting said locking bars to said crosshead for indicating the amount of opening thereof.

3. In combination, a dump truck having a chassis, a cab, a dump body pivotally mounted on said chassis, means for elevating said dump body, a tail gate pivotally secured at its upper end to said dump body, a pair of keeper pins mounted on opposite ends of the lower portion of said tail gate, a locking bar mounted on each side of said body for longitudinal reciprocal movement thereon, a hook formed on one end of each of said bars engageable with a respective one of said keeper pins, a shaft journalled on said body and extending transversely and perpendicularly thereof, link means each having one end thereof rigidly attached to opposite ends of said shaft and the opposite ends thereof pivotally attached to each of said respective bars, a pneumatic cylinder pivotally secured at its forward end to said dump body, a piston slidably mounted in said pneumatic cylinder, a piston rod secured to said piston and extending from the rear end of said pneumatic cylinder, a conduit extending from each end of said pneumatic cylinder for connecting said cylinder to a source of fluid pressure supply, a hand controlled valve connected in said conduits for selectively coupling each end of said pneumatic cylinder to the source of fluid pressure, a hydraulic cylinder fixedly secured to said pneumatic cylinder in parallel relationship therewith, a piston slideable in said hydraulic cylinder, a piston rod secured to said second named piston and extending from the rear end of said hydraulic cylinder, a crosshead secured to and rigidly connecting the rear end of said first and second piston rods, a link having one end thereof pivotally secured to said crosshead and having the other end thereof rigidly secured to said shaft, pipes extending from each end of said hydraulic cylinder for connecting said cylinder to a source of liquid supply, a check valve having a pair of normally seated opposed balls disposed in said pipes, and hand actuated means for selectively unseating one of said balls for controlling the flow of hydraulic fluid in said hydraulic cylinder whereby said second piston can be locked in selected position in said hydraulic cylinder to thereby lock said crosshead and said first piston in adjusted position.

4. A device as claimed in claim 3 wherein said opposite end of said first named links swing in an arc about said shaft from a point underlying said shaft to a point disposed on the side of said shaft opposite said keeper pins and above a line extending through the axis of said shaft and said keeper pins, said first named links when in said second position having an over center toggle locking action whereby in order to open said tail gate said shaft must be positively actuated by said pneumatic cylinder.

References Cited in the file of this patent

UNITED STATES PATENTS

| 231,505 | Stevens | Aug. 24, 1880 |
| 250,103 | Reynolds | Nov. 29, 1881 |
| 404,447 | Thayer | June 4, 1889 |
| 404,523 | Elmes | June 4, 1889 |
| 2,220,202 | Bohne | Nov. 5, 1940 |
| 2,645,522 | Kersey | July 14, 1953 |
| 2,653,847 | Helsel | Sept. 29, 1953 |
| 2,675,268 | Hutchinson | Apr. 13, 1954 |